US009534074B2

(12) United States Patent
Eswarakrishnan et al.

(10) Patent No.: US 9,534,074 B2
(45) Date of Patent: Jan. 3, 2017

(54) AQUEOUS RESINOUS DISPERSIONS THAT INCLUDE A ZINC (II) AMIDINE COMPLEX AND METHODS FOR THE MANUFACTURE THEREOF

(75) Inventors: Venkatachalam Eswarakrishnan, Allison Park, PA (US); Andrea Gray, Vandergrift, PA (US); Jonathan A. Love, Natrona Heights, PA (US); Kelly Moore, Dunbar, PA (US); Michael Sandala, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 755 days.

(21) Appl. No.: 13/531,935

(22) Filed: Jun. 25, 2012

(65) Prior Publication Data
US 2013/0344231 A1    Dec. 26, 2013

(51) Int. Cl.
| | | |
|---|---|---|
| B05D 1/18 | (2006.01) | |
| B05D 3/14 | (2006.01) | |
| C08G 18/08 | (2006.01) | |
| C08G 18/18 | (2006.01) | |
| C08G 18/22 | (2006.01) | |
| C08G 18/28 | (2006.01) | |
| C08G 18/32 | (2006.01) | |
| C08G 18/40 | (2006.01) | |
| C08G 18/50 | (2006.01) | |
| C08G 18/58 | (2006.01) | |
| C08G 18/76 | (2006.01) | |
| C08G 18/80 | (2006.01) | |
| C09D 5/44 | (2006.01) | |
| C09D 175/08 | (2006.01) | |
| C25D 9/08 | (2006.01) | |

(52) U.S. Cl.
CPC ............... *C08G 18/503* (2013.01); *B05D 1/18* (2013.01); *B05D 3/14* (2013.01); *C08G 18/0814* (2013.01); *C08G 18/1858* (2013.01); *C08G 18/222* (2013.01); *C08G 18/289* (2013.01); *C08G 18/3206* (2013.01); *C08G 18/4045* (2013.01); *C08G 18/584* (2013.01); *C08G 18/7621* (2013.01); *C08G 18/8029* (2013.01); *C08G 18/8064* (2013.01); *C09D 5/448* (2013.01); *C09D 5/4438* (2013.01); *C09D 5/4465* (2013.01); *C09D 5/4476* (2013.01); *C09D 175/08* (2013.01); *C25D 9/08* (2013.01)

(58) Field of Classification Search
CPC . C08G 18/503; C08G 18/584; C08G 18/7621; C08G 18/8029; C08G 18/8064; C08G 18/0814; C08G 18/1858; C08G 18/222; C08G 18/289; C08G 18/3206; C08G 18/4045; C09D 175/08; C09D 5/4438; C09D 5/4465; C09D 5/4476; C09D 5/448; B05D 1/18; B05D 3/14; C25D 9/08
USPC ........ 524/589, 590, 591, 839, 840; 523/402, 523/415
See application file for complete search history.

(56) References Cited

U.S. PATENT DOCUMENTS

| | | |
|---|---|---|
| 3,455,806 A | 7/1969 | Spoor et al. |
| 3,694,389 A | 9/1972 | Levy |
| 3,793,278 A | 2/1974 | De Bona |
| 3,928,157 A | 12/1975 | Suematsu et al. |
| 3,962,165 A | 6/1976 | Bosso et al. |
| 3,964,389 A | 6/1976 | Peterson |
| 3,975,346 A | 8/1976 | Bosso et al. |
| 4,001,156 A | 1/1977 | Bosso et al. |
| 4,031,050 A | 6/1977 | Jerabek |
| 4,104,147 A | 8/1978 | Marchetti et al. |
| 4,432,850 A | 2/1984 | Moriarity et al. |
| 4,452,963 A | 6/1984 | Moriarity |
| 4,647,604 A | 3/1987 | Kempter et al. |
| 4,793,867 A | 12/1988 | Charles et al. |
| 5,157,060 A | 10/1992 | Redman |
| 5,588,989 A | 12/1996 | Vonk et al. |
| 6,017,432 A | 1/2000 | Boyd et al. |
| 6,033,545 A | 3/2000 | Kaylo et al. |
| 6,051,675 A * | 4/2000 | Gras ............... C08G 18/4219 252/182.21 |
| 6,093,298 A | 7/2000 | Kaylo et al. |
| 6,132,581 A | 10/2000 | Kaylo et al. |
| 6,165,338 A | 12/2000 | December et al. |
| 6,190,523 B1 | 2/2001 | Tazzia |
| 7,485,729 B2 | 2/2009 | Hsieh et al. |
| 7,842,762 B2 | 11/2010 | Zawacky et al. |
| 2003/0054193 A1 | 3/2003 | McCollum et al. |
| 2004/0069637 A1 | 4/2004 | Eswarakrishnan et al. |
| 2004/0159548 A1 | 8/2004 | Peffer et al. |
| 2006/0247341 A1 | 11/2006 | Hsich et al. |
| 2007/0015873 A1 | 1/2007 | Fenn |
| 2008/0145678 A1 | 6/2008 | McMurdie et al. |
| 2009/0032144 A1 | 2/2009 | McMillen et al. |
| 2010/0243455 A1 | 9/2010 | Van Buskirk et al. |

FOREIGN PATENT DOCUMENTS

| | | | |
|---|---|---|---|
| EP | 0012463 B1 | 6/1982 | |
| EP | 0269102 B1 | 3/1991 | |
| WO | WO 2012/161846 | * 11/2012 | |

OTHER PUBLICATIONS

Author Unknown, "The Chemistry of Polyurethane Coatings: A General Reference Manual", Bayer MaterialScience, Aug. 2005.*

* cited by examiner

*Primary Examiner* — Patrick Niland
(74) *Attorney, Agent, or Firm* — Charles M. Yeomans; Alicia M. Passerin

(57) ABSTRACT

Disclosed herein are stable aqueous resinous dispersions and methods for forming such dispersions that include a zinc (II) amidine complex.

20 Claims, No Drawings

AQUEOUS RESINOUS DISPERSIONS THAT INCLUDE A ZINC (II) AMIDINE COMPLEX AND METHODS FOR THE MANUFACTURE THEREOF

FIELD

The present invention relates to aqueous resinous dispersions, methods for making such dispersions, related coating compositions and coated substrates.

BACKGROUND INFORMATION

Electrodeposition as a coating application method involves the deposition onto a conductive substrate of a film-forming composition under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodeposition is used commercially, with cationic being more prevalent in applications desiring a high level of corrosion protection.

Cationic electrodepositable compositions often comprise an aqueous resinous dispersion comprising (i) an active-hydrogen, cationic salt group containing film-forming resin, and (ii) an at least partially blocked isocyanate crosslinking agent. Such compositions also often include a catalyst for the reaction between the resin and the crosslinking agent, such as organotin compounds, among others. More recently, alternative catalysts, such as zinc (II) amidine complexes, have been introduced. Such catalysts are thought to provide better cure rates at relatively low temperatures (low temperature cures may be desirable to, for example, reduce energy costs) and may be less toxic and environmentally undesirable than, for example, organotin compounds.

One drawback to the use of zinc (II) amidine complexes as a catalyst in low temperature cure compositions, however, has been the inability to achieve stable aqueous dispersions comprising such catalysts in combination with an active-hydrogen, cationic salt group containing film-forming resin and an at least partially blocked isocyanate that deblocks at low temperatures. As a result, the use of such catalysts in "low temperature cure" applications has been difficult. The present invention, however, provides methods for using such catalysts in such applications.

SUMMARY OF THE INVENTION

In certain respects, the present invention is directed to methods for making an aqueous resinous dispersion. These methods comprise combining a first aqueous resinous dispersion with a second aqueous resinous dispersion. The first aqueous resinous dispersion comprises (i) an active hydrogen-containing, cationic salt group-containing polymer; and (ii) a zinc (II) amidine complex. The second aqueous resinous dispersion comprises: (i) an active hydrogen-containing, cationic salt group-containing polymer; and (ii) an at least partially blocked polyisocyanate.

In other respects, the present invention is directed to aqueous resinous dispersions that are stable dispersions and that comprise: (a) an active hydrogen-containing, cationic salt group-containing polymer; (b) a zinc (II) amidine complex; and (c) an at least partially blocked polyisocyanate that is selected so as to provide an aqueous resinous dispersion that cures at a temperature of 320° F. or below.

The present invention is also directed to methods for electrophoretically depositing and curing an aqueous resinous dispersion onto a substrate, as well as coated substrate formed therefrom.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to methods for making an aqueous resinous dispersion. These methods comprise combining a first aqueous resinous dispersion with a second aqueous resinous dispersion. As used herein, the term "aqueous resinous dispersion" refers to a two-phase transparent, translucent or opaque resinous system in which a polymer is in the dispersed phase and the dispersing medium, which includes water, is in the continuous phase. In the present invention, these aqueous resinous dispersions are electrodepositable aqueous resinous dispersions. As used herein, "electrodepositable aqueous resinous dispersion" refers to an aqueous dispersion that is suitable for use in an electrodepositable coating composition, that is, a coating composition that is capable of being deposited onto a conductive substrate under the influence of an applied electrical potential. In certain embodiments, the aqueous resinous dispersions described herein are stable dispersions. As used herein, the term "stable dispersion" refers to a dispersion that does not gel, flocculate or precipitate when maintained at a temperature of 25° C. for at least 60 days, or, if some precipitation does occur, the precipitate can be redispersed upon agitation.

As will be appreciated, besides water, the dispersing medium can, in certain embodiments, contain some organic cosolvents. In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents are, in certain embodiments, used in amounts less than 10 percent by weight, such as less than 5 percent by weight, based on total weight of the dispersing medium.

As indicated, in the methods of the present invention, the first aqueous resinous dispersion comprises (i) an active hydrogen-containing, cationic salt group-containing polymer; and (ii) a zinc (II) amidine complex.

As used herein, the term "active hydrogen-containing, cationic salt group-containing polymer" refers to polymers that include active hydrogen functional groups and at least partially neutralized cationic groups, such as sulfonium groups and amine groups, that impart a positive charge. As used herein, the term "polymer" encompasses, but is not limited to, oligomers and both homopolymers and copolymers. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927) and include, for example, hydroxyl groups, primary or secondary amine groups, and thiol groups. In certain embodiments, the active hydrogen functional groups are hydroxyl groups, primary amine groups and/or secondary amine groups.

Examples of polymers that are suitable for use as the active hydrogen-containing, cationic salt group-containing polymer in the present invention include, but are not limited to, alkyd polymers, acrylics, polyepoxides, polyamides, polyurethanes, polyureas, polyethers, and polyesters, among others. In certain embodiments, such polymers comprise amine and/or hydroxyl groups.

More specific examples of suitable active hydrogen-containing, cationic salt group containing polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference, can be used.

Besides amine salt group-containing resins, quaternary ammonium salt group-containing resins can also be employed as a cationic salt group-containing polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Other suitable cationic salt group-containing resins include those that may form photodegradation resistant electrodepositable coating compositions. Such polymers include the polymers comprising cationic amine salt groups which are derived from pendant and/or terminal amino groups that are disclosed in United States Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication US 2003/0054193 A1 at [0096] to [0123], this portion of which being incorporated herein by reference.

In certain embodiments, the active hydrogen-containing, cationic salt group-containing polymer is present in the first aqueous resinous dispersion in an amount of 50 to 99 percent by weight, such as 70 to 95 percent by weight, based on the total solids weight of the first aqueous resinous dispersion.

As indicated earlier, the first aqueous resinous dispersion also comprises a zinc (II) amidine complex. In certain embodiments, the zinc (II) amidine complex contains amidine and carboxylate ligands. More specifically, in certain embodiments, the zinc (II) amidine complex is as described in U.S. Pat. No. 7,485,729 at col. 7, line 43 to col. 8, line 51 and col. 10, line 11 to col. 12, line 61, the cited portions of which being incorporated herein by reference. As will be appreciated, the foregoing patent describes compounds having the formula $Zn(A)_2(C)_2$ wherein A represents an amidine and C represents a carboxylate. More specifically, A may be represented by the formula (1) or (2):

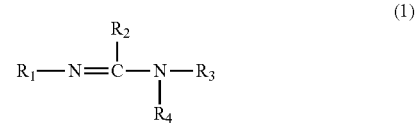

(1)

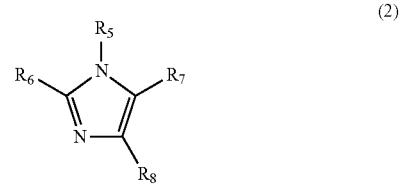

(2)

in which $R_1$-$R_8$ are described, for example, in U.S. Pat. No. 7,485,729 at col. 10, line 37 to col. 11, line 31; and C is an aliphatic, aromatic or polymeric carboxylate with an equivalent weight of 45 to 465.

Such a zinc (II) amidine complex is commercially available from King Industries of Norwalk Conn. under product code K-KAT® XK620.

In certain embodiments, the zinc (II) amidine complex is present in the first aqueous resinous dispersion in an amount of 1 to 40 percent by weight, such as 10 to 30 percent by weight, based on the total solids weight of the first aqueous resinous dispersion.

As will be appreciated, the first aqueous resinous dispersion may include any of a variety of optional ingredients, such as colorants (e.g., titanium dioxide, carbon black), antioxidants, biocides, defoamers, surfactants, wetting agents, dispersing aids, clays, hindered amine light stabilizers, UV light absorbers and stabilizers, or combinations thereof.

In certain embodiments, however, the first aqueous resinous dispersion is substantially, or, in some cases, completely free of any crosslinking agent, such as an at least partially blocked polyisocyanate, such as any of the at least partially blocked polyisocyanates described below. As used in this paragraph, when it is stated that an aqueous resinous dispersion is "substantially free" of a particular substance, it means that the substance being referred to, such as an at least partially blocked polyisocyanate, is not present in the aqueous resinous dispersion in an amount sufficient to render the aqueous resinous dispersion unstable; in other words, the aqueous resinous dispersion remains a "stable dispersion" as defined earlier. As used in this paragraph, when it is stated that an aqueous resinous dispersion is "completely free" of a particular substance, such as an at least partially blocked polyisocyanate, it means that the substance is not present in the aqueous resinous dispersion at all.

Moreover, in certain embodiments, the first aqueous resinous dispersion is substantially, or, in some cases, completely free of environmentally unfriendly tin-containing metal catalysts (such as dibutyltin dilaurate, dibutyltin dioxde, dibutyltin dineodecanoate, dibutyltin diacetate, dioctyltin dioleate, among others). As used in this paragraph, when it is stated that an aqueous resinous dispersion is "substantially free" of a tin-containing metal catalysts, it means that such a material is present in the aqueous resinous dispersion in an amount such that when the coating composition is formed, the material is present in an amount of less than 0.1 percent by weight, based on the total weight of resin solids in the coating composition.

The Examples herein illustrate suitable methods for making the first aqueous dispersion. In certain embodiments, the active hydrogen-containing, cationic salt group-containing polymer is formed prior to mixture with the zinc (II) amidine complex, while in certain embodiments, an active hydrogen-containing polymer is mixed with the zinc (II) amidine complex prior to the polymeric material being reacted with a cationic salt group former to form a cationic salt group-containing polymer. In either of these embodiments, water may then be added to the mixture. In certain embodiments, the zinc (II) amidine complex is first mixed with water, or a mixture of water and an acid, prior to its mixture with the polymer. Exemplary acids for this purpose include, but are not limited to, lactic acid, acetic acid, formic acid and/or sulfamic acid.

As indicated earlier, in the methods of the present invention, the first aqueous dispersion is combined with a second aqueous dispersion. Moreover, in the methods of the present invention, the second aqueous dispersion comprises (i) an active hydrogen-containing, cationic salt group-containing polymer; and (ii) an at least partially blocked polyisocyanate.

The active hydrogen-containing, cationic salt group-containing polymer present in the second aqueous dispersion may comprise any of the polymers described above with respect to the first aqueous dispersion. In some embodiments, the first aqueous dispersion and the second aqueous dispersion comprise the same active hydrogen-containing, cationic salt group-containing polymer. In some embodiments, the first aqueous dispersion and the second aqueous dispersion comprise active hydrogen-containing, cationic salt group-containing polymers that are different from each other. For example, in some embodiments, the first aqueous resinous dispersion comprises an ungelled polyepoxide-polyoxyalkylenepolyamine resin, as described above, and the second aqueous resinous dispersion comprises a polyepoxide-amine adduct, wherein a portion of the amine that is reacted with the polyepoxide is a ketimine of a polyamine, as described above.

In certain embodiments, the active hydrogen-containing, cationic salt group-containing polymer is present in the second aqueous resinous dispersion in an amount of 50 to 90 percent by weight, such as 60 to 80 percent by weight, based on the total solids weight of the second aqueous resinous dispersion.

In addition to the active hydrogen-containing, cationic salt group-containing polymer, the second aqueous dispersion also comprises an at least partially blocked polyisocyanate. As used herein, the term "at least partially blocked polyisocyanate" means a polyisocyanate where at least a portion of the isocyanato groups have been reacted with a compound so that the resultant capped isocyanate portion is stable to hydroxyl or amine groups at room temperature but reactive with hydroxyl or amine groups at elevated temperature, usually 200° F. (93° C.) or higher. A "partially blocked polyisocyanate" will contain an average of about one free reactive isocyanate group, whereas a "fully blocked polyisocyanate" will contain no free reactive isocyanate groups.

More specifically, in certain embodiments of the present invention, the second aqueous dispersion comprises an at least partially blocked polyisocyanate that is selected so as to provide, when combined with the first aqueous resinous dispersion, an aqueous resinous dispersion that cures at a temperature of 320° F. (160° C.) or below, such as 250° F. (121° C.) to 320° F. (160° C.), 275° F. (135° C.) to 320° F. (160° C.), or, in some cases, 275° F. (135° C.) to 300° F. (149° C.). In some embodiments, the at least partially blocked polyisocyanate deblocks a temperature such that excellent cures of the resulting coating composition can be achieved at 275° F. (121° C.). As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK HI DMTA analyzer conducted under nitrogen.

The polyisocyanates that can be used in preparing an at least partially blocked polyisocyanate suitable for use in the present invention include aliphatic and aromatic polyisocyanates. Representative examples of aliphatic polyisocyanates are (i) alkylene isocyanates, such as trimethylene, tetramethylene, pentamethylene, hexamethylene, 1,2-propylene, 1,2-butylene, 2,3-butylene, 1,3-butylene, ethylidene and butylidene diisocyanates, and (ii) cycloalkylene isocyanates, such as 1,3-cyclopentane, 1,4-cyclohexane, 1,2-cyclohexane diisocyanates and isophorone diisocyanates. Representative examples of suitable aromatic polyisocyanates are (i) arylene isocyanates, such as m-phenylene, p-phenylene, 4,4'-diphenyl, 1,5-naphthalene and 1,4-naphthalene diisocyanates, and (ii) alkarylene isocyanates, such as 4,4'-diphenylene methane, 2,4- or 2,6-tolylene, or mixtures thereof, 4,4'-toluidine, and 1,4-xylylene diisocyanates. Triisocyanates, such as triphenyl methane-4,4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, can also be used.

In certain embodiments, the at least partially blocked polyisocyanate present in the second aqueous dispersion of the methods of the present invention comprises a urethane-containing material having a moiety of the structure (3):

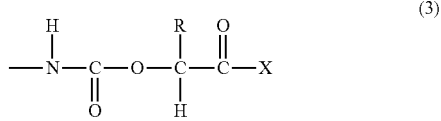

in which R is H, an alkyl, alkenyl, or aryl group, and X is H, an alkyl, alkenyl, an aryl group, or $—N(R_1)(R_2)$, in which $R_1$ and $R_2$ are, each independently, H, an alkyl, an alkenyl, or an aryl group.

Such urethane-containing materials, and methods for their production, are described in U.S. Pat. No. 4,452,963 at col. 1, line 47 to col. 5, line 13, the cited portion of which being incorporated herein by reference. In certain embodiments, such a urethane-containing material is prepared by reacting an isocyanate with a compound of the structure (4):

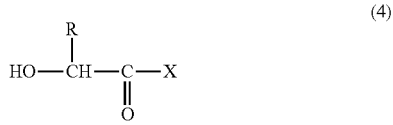

in which R can be H or a hydrocarbyl or substituted hydrocarbyl group, a saturated or unsaturated hydrocarbyl group, such as an alkyl, alkenyl or aryl group, and X can be H or a hydrocarbyl or substituted hydrocarbyl group, a saturated or unsaturated hydrocarbyl group, such as an alkyl, alkenyl or aryl group.

Other at least partially blocked polyisicyanates, which are suitable for use in the present invention, include: (i) those polyisocyanates at least partially blocked with a material having the structure (5):

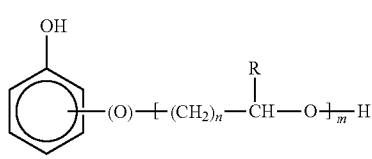

in which n is a number from 1 to 10; m is a number from 1 to 10; and R is H or an alkyl or an aryl group or substituted alkyl or aryl group having from 1 to 30 carbon atoms, which are described in U.S. Pat. No. 6,017,432 at col. 2, line 43-64 and col. 6, line 33 to col. 8, line 38, the cited portion of which being incorporated herein by reference; (ii) ketoxime-blocked polyisocyanates, which are described in U.S. Pat. No. 3,694,389 at col. 2, line 24 to col. 6, line 29, the cited portion of which being incorporated herein by reference; and (iii) 3,5-dimethylpyrazole blocked polyisocyanates, such as those commercially available from Baxenden Chemicals, Ltd., Lancashire, England.

In certain embodiments, the at least partially blocked polyisocyanate is present in the second aqueous resinous dispersion in an amount of 10 to 50 percent by weight, such as 30 to 45 percent by weight, based on the total solids weight of the second aqueous resinous dispersion.

As will be appreciated, the second aqueous resinous dispersion may, if desired, include any of a variety of optional ingredients, such as colorants (e.g., titanium dioxide, carbon black), antioxidants, biocides, defoamers, surfactants, wetting agents, dispersing aids, clays, hindered amine light stabilizers, UV light absorbers and stabilizers, or combinations thereof.

The Examples herein illustrate suitable methods for making the second aqueous dispersion.

In the methods of the present invention, the first aqueous dispersion is combined with the second aqueous dispersion. Such combining can occur in any suitable container, including, but not limited to, an electrodeposition bath, under suitable agitation. Moreover, as will be appreciated, in addition to the first aqueous resinous dispersion and the second aqueous resinous dispersion, other coating composition components may be combined, such as, for example, a pigment dispersion that comprises a pigment dispersed in a resinous material, often referred to as a pigment grind vehicle. The pigment content of the dispersion is usually expressed as the pigment-to-resin weight ratio. In the practice of the present invention, the pigment-to-resin weight ratio is sometimes within the range of 0.03 to 0.35, when pigment is used. The other additives mentioned above are usually in the composition in amounts of 0.01 to 3 percent by weight based on total weight of resin solids.

The resin solids content of the compositions produced according to the methods of the present invention depends upon the particular end use thereof and is often not critical. Compositions containing at least 1 percent by weight, such as from 5 to 40 percent by weight or 5 to 20 percent by weight, resin solids are common. By resin solids is meant the non volatile organic content of the composition, i.e., organic materials which will not volatilize when heated to 110° C. for 15 minutes, and would exclude organic solvents.

It has been surprisingly discovered that the methods of the present invention provides for improved characteristics of the resultant dispersion. More particularly, it was surprisingly discovered that addition of a zinc (II) amidine complex directly into an aqueous resinous dispersion comprising an active hydrogen-containing, cationic salt group-containing polymer and an at least partially blocked polyisocyanate that deblocks at low temperatures, such as those described above, resulted in a dispersion that is not a stable dispersion. On the other hand, when a coating composition is prepared according to the methods disclosed herein, a stable aqueous resinous dispersion is produced.

As a result, the present invention is also directed to aqueous resinous dispersions that are stable dispersions and that comprise: (a) an active hydrogen-containing, cationic salt group-containing polymer; (b) a zinc (II) amidine complex; and (c) an at least partially blocked polyisocyanate that is selected so as to provide an aqueous resinous dispersion that cures at a temperature of 320° F. (160° C.) or below.

In certain embodiments, the coating compositions produced by the methods of the present invention are deposited upon a electrically conductive substrate by placing the composition in contact with an electrically conductive anode and an electrically conductive cathode, with the surface to be coated being the cathode. Following contact with the composition, an adherent film of the coating composition is deposited on the cathode and a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but is often between 50 and 500 volts. The current density is often between 0.5 ampere and 15 amperes per square foot and tends to decrease during electrodeposition indicating the formation of an insulating film.

Once the electrodepositable coating composition is electrodeposited over at least a portion of the electroconductive substrate, the coated substrate is heated to a temperature and for a time sufficient to cure the electrodeposited coating on the substrate. In certain embodiments, the coated substrate is heated to a temperature ranging from 250° F. to 360° F. (121.1° C. to 180° C.), such as from 250° F. to 300° F. (135° C. to 149° C.). The curing time can be dependent upon the curing temperature as well as other variables, for example, film thickness of the electrodeposited coating. For purposes of the present invention, all that is necessary is that the time be sufficient to effect cure of the coating on the substrate. For example, the curing time can range from 10 minutes to 60 minutes, such as 20 to 40 minutes.

In certain embodiments, the coated substrate is heated to a temperature of 300° F. (149° C.) or less for a time sufficient to effect cure of the electrodeposited coating on the substrate. The thickness of the resultant cured coating often ranges from 15 to 50 microns.

The coating compositions produced by the methods of the present invention can also, if desired, be applied to a substrate using non-electrophoretic coating application techniques, such as flow, dip, spray and roll coating applications. For electrodeposition and non-electrophoretic coating applications, the coating compositions can be applied to a variety of electroconductive substrates especially metal such as steel, aluminum, copper, magnesium and the like, but also including metallized plastic and conductive carbon-coated materials. For non-electrophoretic coating applications, compositions can be applied to the non-metallic substrates such as glass, wood and plastic. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. It will also be understood that, in some embodiments, the substrate may be pretreated with a pretreatment solution, such as a zinc phosphate solution as described in U.S. Pat. Nos. 4,793,867 and 5,588,989 or a zirconium containing solution such as described in U.S. patent application Ser. Nos. 11/610,073 and 11/833,525.

In certain embodiments, therefore, the present invention is also directed to methods for coating an electroconductive substrate. In certain embodiments, such methods comprise (a) electrophoretically depositing on the substrate an aqueous resinous dispersion of the present invention and (b) heating the coated substrate to a temperature and for a time sufficient to cure the electrodeposited coating on the substrate. In certain embodiments, such methods comprise (a) electrophoretically depositing on the substrate an aqueous resinous dispersion of the present invention to form an electrodeposited coating over at least a portion of the substrate, (b) heating the coated substrate to a temperature and for a time sufficient to cure the electrodeposited coating on the substrate, (c) applying to the cured electrodeposited coating one or more pigment-containing coating compositions and/or one or more pigment-free coating compositions to form a top coat over at least a portion of the cured electrodeposited coating, and (d) heating the coated substrate of step (c) to a temperature and for a time sufficient to cure the top coat.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Blocked Polyisocyanate

TABLE 1

| # | Materials | Parts |
|---|---|---|
| 1 | Toluenediisocyanate | 7568.8 |
| 2 | Methyl isobutyl ketone | 5300.0 |
| 3 | Trimethylol propane | 1950.0 |
| 4 | Dibutyl tin dilaurate | 3.9 |
| 5 | Methyl isobutyl ketone | 25.0 |
| 6 | Dibutylglycolamide[1] | 8816.0 |
| 7 | Methyl isobutyl ketone | 44.6 |
| 8 | Methyl isobutyl ketone | 880.0 |
| 9 | Bisphenol A polyol[2] | 2137.5 |
| 10 | Propyleneglycol monophenylether | 100.0 |
| 11 | Propyleneglycol monophenylether | 2400.0 |

[1]Formed as the reaction product of dibutylamine and glycolic acid
[2]A Bisphenol A/6-ethylene oxide adduct To a reactor, materials 1 and 2 were charged and heated to 32° C. Material 3 was then added in three portions to the reactor at 32° C. At this point, the reaction exothermed. The batch was held for 1 hr at 65° C., at which point the batch was cooled to 60° C. and material 4 was added. The lines leading into the reactor were rinsed with material 5. Next, material 6 was added to the reactor over 45 minutes, wherein the reaction exothermed. The exotherm was kept below 100° C. Next, the lines leading into the reactor were rinsed with material 7. Material 8 was then added to the reactor and the batch was held at 90° C. for two hours. Materials 9 and 10 were then charged into the reactor and the composition held for 30 minutes, at which point material 11 was added to the reactor and the composition was held for 45 minutes, therein forming the dibutylglycolamide crosslinker.

Example 2

Preparation of Aqueous Resinous Dispersion Containing an Active Hydrogen-Containing, Cationic Salt Group-Containing Polymer and a Blocked Isocyanate

TABLE 2

| # | Material | Parts |
|---|---|---|
| 1 | Epon ® 828[3] | 9660 |
| 2 | Bisphenol A | 4237 |
| 3 | Methyl isobutyl ketone | 730 |
| 4 | Ethyl triphenylphosphonium iodide | 9.7 |
| 5 | Propyleneglycol monophenylether | 1435 |
| 6 | Methyl isobutyl ketone | 406 |
| 7 | Diketimine[4] | 1015 |
| 8 | Methyl ethanol amine | 866 |
| 9 | Product of Example 1 | 18061 |
| 10 | Methyl isobutyl ketone | 25 |
| 11 | Deionized water | 14790 |
| 12 | Formic acid | 606 |
| 13 | Deionized water | 30484 |

[3]Epoxy resin available from Hexion Specialty Chemicals
[4]Formed as the reaction product of diethylenetriamine and methyl isobutyl ketone To a reactor, materials 1, 2, 3 and 4 were charged and heated to 130° C., at which point the reaction exotherms. The temperature inside the reactor was then adjusted to 160° C. and the composition held for 1 hour. Material 5 and 6 were then added the reactor and the reactor was cooled to 105° C., at which point materials 7 and 8 were added. The temperature inside the reactor was then adjusted to 120° C. and held for two hours At this point, materials 9 and 10 were added and the reactor was held for 20 minutes at 95° C. The reactor contents were then poured into another container that included materials 11 and 12. The new container was held for 1 hour and material 13 was added. The solvent was removed from the contents of the new reactor in vacuum to form a cationic resin having a solids content of 36.7% solids. The resultant dispersion was a single phase material and exhibited no settling over time (greater than 60 days).

Example 3

Preparation of an Aqueous Resinous Dispersion Containing an Active Hydrogen-Containing, Cationic Salt Group-Containing Polymer, a Blocked Polyisocyanate, and a Zinc (II) Amidine Complex

TABLE 3

| # | Material | Parts |
|---|---|---|
| 1 | Epon ® 828[3] | 362.3 |
| 2 | Bisphenol A | 158.9 |
| 3 | Methyl isobutyl ketone | 27.4 |
| 4 | Ethyl triphenylphosphonium iodide | 0.4 |
| 5 | Propyleneglycol monophenylether | 53.8 |
| 6 | Methyl isobutyl ketone | 15.2 |
| 7 | Diketimine[4] | 38.1 |
| 8 | Methyl ethanol amine | 32.5 |
| 9 | Crosslinker of Example 1 | 677.3 |
| 10 | Methyl isobutyl ketone | 1 |
| 11 | K-KAT-XK-620[5] | 18.6 |
| 12 | Deionized water | 468.4 |
| 13 | Formic acid | 21.8 |
| 14 | Deionized water | 1696 |

[5]Zinc amidine catalyst commercially available from King Industries.

In this example, a reactor was charged with materials 1, 2, 3 and 4 and heated to 130° C., at which point the reaction exothermed. The temperature inside the reactor was then adjusted to 160° C. and the composition held for 1 hour. Material 5 and 6 were then added the reactor and the reactor was cooled to 105° C., at which point materials 7 and 8 were added. The temperature inside the reactor was then adjusted to 120° C. and held for two hours At this point, materials 9 and 10 were added and the reactor was held for 20 minutes at 95° C. Material 11 was then added to the reactor at 90° C. and was allowed to mix for 15 minutes. The reactor contents were then poured into another container that included materials 12 and 13. The new container was held for 1 hour and material 14 was added. The solvent was removed from the contents of the new reactor in vacuum. The resultant dispersion was unstable and exhibited phase separation and precipitated in 2 days. The instability of the dispersion made it unsuitable for introduction into a cationic electrodepositable coating composition.

Example 4

Preparation of a "First Aqueous Dispersion" According to an Embodiment of the Methods of the Present Invention

TABLE 4

| # | Material | Parts |
|---|---|---|
| 1 | Epon ® 828[3] | 401.9 |
| 2 | Bisphenol A | 122.5 |
| 3 | Butyl Carbitol formal | 58.5 |
| 4 | Ethyl triphenyl phosphonium iodide | 0.4 |
| 5 | Butyl Carbitol formal | 100.1 |
| 6 | Jeffamine D2000[6] | 1438.4 |
| 7 | Butyl Carbitol formal | 43.5 |
| 8 | Rhoadameen C5[7] | 109.1 |
| 9 | Butyl Carbitol formal | 16.9 |
| 10 | K-KAT-XK-620[5] | 509.1 |
| 11 | Lactic acid | 293.9 |
| 12 | Deionized water | 2404.8 |
| 13 | Deionized water | 548.0 |

[6]A polypropylene oxide resin terminated with primary amines available from Huntsman Chemical
[7]A surfactant available from Rhodia Chemicals Materials 1, 2, and 3 were charged sequentially into a reactor and heated to 125° C. Item 4 was then added to the reactor and allowed to exotherm, adjusting the temperature to 160° C. and holding the mixture at 160° C. for one hour, at which point Material 5 was then added to the reactor. Material 6 was then added to the reactor, while stirring, over 10 minutes and the composition was allowed to exotherm. The lines to the reactor were then rinsed with material 7, at which point the temperature of the reactor was adjusted to 125-130° C. and held for 3 hours. At this point, materials 8 and 10 were added to the reactor and the lines to the reactor were rinsed with material 9. The composition was stirred for 10 minutes. The resultant composition (2380.3 parts) was then added to materials 11 and 12 in a second reactor and stirred for 30 minutes. Material 13 was then added. The resultant resin composition had a solids content of 35.80%. The resultant resin composition was a single phase material and exhibited no settling over time (greater than 60 days).

Example 5

Preparation of a "First Aqueous Dispersion" According to an Embodiment of the Methods of the Present Invention

TABLE 5

| # | Material | Parts |
|---|---|---|
| 1 | Epon ® 828[3] | 201.0 |
| 2 | Bisphenol A | 61.3 |
| 3 | Butyl Carbitol formal | 29.3 |
| 4 | Ethyl triphenyl phosphonium iodide | 0.2 |
| 5 | Butyl Carbitol formal | 50.1 |
| 6 | Jeffamine D2000[6] | 719.2 |
| 7 | Butyl Carbitol formal | 21.8 |
| 8 | Rhoadameen C5[7] | 54.5 |
| 9 | Butyl Carbitol formal | 8.5 |
| 10 | Lactic acid | 147.0 |
| 11 | K-KAT-XK-620[5] | 216.4 |
| 12 | Deionized water | 1258.2 |
| 13 | Deionized water | 1112.3 |

Materials 1, 2, and 3 were charged sequentially to a reactor and heated to 125° C. Item 4 was added and allowed to exotherm, adjusting the temperature to 160° C. and holding the mixture at 160° C. for one hour, at which point Material 5 was then added to the reactor. Material 6 was then added to the reactor, while stirring, over 10 minutes and the composition was allowed to exotherm. The lines to the reactor were then rinsed with material 7, at which point the temperature of the reactor was adjusted to 125-130° C. and held for 3 hours. At this point, materials 8 and 10 were added to the reactor and the lines to the reactor were rinsed with material 9. The composition was stirred for 10 minutes. The resultant composition (973.8 parts) was then added to materials 10, 11 and 12 in a separate reactor and stirred for 30 minutes. Material 13 was then added to the reactor to give a solution having a solids content of 32.4%. The resultant dispersion was a single phase material and exhibited no settling over time (greater than 60 days).

Example 6

Combination of Aqueous Resinous Dispersions

TABLE 6

| Material | Parts |
|---|---|
| Example 4 | 125.2 |
| Example 2 | 1840.4 |
| Deionized water | 34.3 |
| Kathon LX[8] | 0.1 |

[8]Microbiocide available from ROHM and HAAS Company.

The materials were blended to give a final solids content for Example 6 of 36%. The resin blend was a single phase material and exhibited no settling over time (greater than 60 days).

Example 7

Combination of Aqueous Resinous Dispersions

TABLE 7

| Material | Parts |
|---|---|
| Example 5 | 137.6 |
| Example 2 | 1840.4 |
| Deionized water | 21.9 |
| Kathon LX[8] | 0.1 |

The materials were blended to give a final solids content for Example 7 of 36%. The resin blend was a single phase material and exhibited no settling over time (greater than 60 days).

Example 8

Electrodepositable Coating Composition from Example 6

This example describes an electrocoat bath composition made using the product of Example 6 and a tin free pigment paste at 0.1 pigment/binder ratio at 15% solids.

TABLE 8

| Materials | Parts |
|---|---|
| Example 6 | 721.0 |
| Pigment Paste[9] | 89.4 |
| Deionized water | 1189.6 |

[9]POWERCRON ® Black Paste commercially available from PPG Industries, Inc.

Example 9

Electrodepositable Coating Composition from Example 7

This example describes an electrocoat bath composition made using the product of Example 7 and a tin free paste CP549 at 0.1 pigment/binder ratio at 15% solids.

TABLE 9

| Materials | Parts |
|---|---|
| Example 7 | 721.0 |
| CP 549[9] | 89.4 |
| Deionized water | 1189.6 |

Example 10

Preparation of Control Resin Blend

This example describes the preparation of a control resin blend at 36% solids. This resin blend was a single phase material and exhibited no settling over time (greater than 60 days).

TABLE 10

| Materials | Parts |
|---|---|
| Example 2 | 79764.0 |
| Polyoxyalkylenepolyamine-polyepoxide | 5230.0 |

TABLE 10-continued

| Materials | Parts |
|---|---|
| adduct[10] | |
| Deionized water | 1691.0 |
| Kathon | 3.9 |

[10]As described in the patent U.S. Pat. No. 4,432,850A

Example 11

Preparation of Control Electrodepositable Coating Composition

This example describes a control electrocoat bath composition made using the product of Example 10 and the DBTO containing paste CP 524 (available from PPG industries) at 0.1 p/b at 15% solids.

TABLE 11

| Materials | Parts |
|---|---|
| CR 659[11] | 840.2 |
| CP 524[12] | 124.0 |
| Deionized water | 1435.8 |

[11]POWERCRON cationic resin commercially available from PPG Industries, Inc.
[12]Cationic resin containing pigment paste commercially available from PPG Industries, Inc.

Example 12

Comparison of Electrodepositable Coating Compositions

The compositions of Examples 8, 9 and 11 were coated at a desired film build of 0.8 mils at coat out conditions (90° F./120"/225V) and (90° F./120"/250V) respectively and were examined for cure over a range of temperatures (20 minutes at peak metal temperature in a gas oven). The results are shown below in Table 12 below.

TABLE 12

| Paint | Cure Temperature (° F.) | Cure (50 acetone double rubs) |
|---|---|---|
| Example 8 | 250 | Fail - 35 ADRS to metal |
| | 275 | Pass - Dulling |
| | 300 | Pass - Slight dulling |
| Example 9 | 250 | Fail - 28 ADRS to metal |
| | 275 | Pass - Dulling |
| | 300 | Pass - Slight dulling |
| Control Example 11 | 250 | Fail - 31 ADRS to metal |
| | 275 | Pass - Dulling |
| | 300 | Pass - Dulling |

Whereas particular embodiments of the invention have been described hereinabove for purposes of illustration, it will be evident to those skilled in the art that numerous variations of the details of the present invention may be made without departing from the invention as defined in the appended claims.

We claim:

1. An aqueous resinous blend comprising:
(a) a first aqueous resinous dispersion comprising:
(i) an active hydrogen-containing, cationic salt group-containing polymer; and
(ii) a zinc (II) amidine complex; and
(b) a second aqueous resinous dispersion comprising:
(i) an active hydrogen-containing, cationic salt group-containing polymer; and
(ii) an at least partially blocked polyisocyanate that is selected so as to provide an aqueous resinous dispersion that cures at a temperature of 320° F. or below,
wherein the aqueous resinous blend is a stable dispersion.

2. The blend of claim 1, wherein the active hydrogen-containing, cationic salt group-containing polymer comprises an ungelled polyepoxide-polyoxyalkylenepolyamine resin.

3. The blend of claim 2, wherein the active hydrogen-containing, cationic salt group-containing polymer further comprises a polyepoxide-amine adduct, wherein a portion of the amine that is reacted with the polyepoxide is a ketimine of a polyamine.

4. The blend of claim 1, wherein the zinc (II) amidine complex comprises amidine and carboxylate ligands.

5. The blend of claim 1, wherein the at least partially blocked polyisocyanate comprises a urethane-containing material having a moiety of the structure (3):

$$\mathrm{-N(H)-C(=O)-O-C(R)(H)-C(=O)-X} \tag{3}$$

in which R is H, an alkyl, alkenyl, or aryl group, and X is H, an alkyl, alkenyl, an aryl group, or —N(R$_1$)(R$_2$), in which R$_1$ and R$_2$ are, each independently, H, an alkyl, an alkenyl, or an aryl group.

6. The blend of claim 1, wherein the blend cures at a temperature of 250° F. to 320° F.

7. The blend of claim 6, wherein the blend cures at a temperature of 275° F. to 320° F.

8. A method comprising placing the blend of claim 1 in contact with an electrically conductive anode and an electrically conductive cathode, with a surface to be coated being the cathode.

9. A method for making an aqueous resinous blend comprising combining a first aqueous resinous dispersion with a second aqueous resinous dispersion, wherein:
(a) the first aqueous resinous dispersion comprises:
(i) an active hydrogen-containing, cationic salt group-containing polymer; and
(ii) a zinc (II) amidine complex; and
(b) the second aqueous resinous dispersion comprises:
(i) an active hydrogen-containing, cationic salt group-containing polymer; and
(ii) an at least partially blocked polyisocyanate.

10. The method of claim 9, wherein the first aqueous resinous dispersion and the second aqueous resinous dispersion are both a stable dispersion.

11. The method of claim 9, wherein the active hydrogen-containing, cationic salt group-containing polymer present in the first aqueous resinous dispersion comprises an ungelled polyepoxide-polyoxyalkylenepolyamine resin.

12. The method of claim 11, wherein the active hydrogen-containing, cationic salt group-containing polymer present in the second aqueous dispersion comprises a polyepoxide-amine adduct, wherein a portion of the amine that is reacted with the polyepoxide is a ketimine of a polyamine.

13. The method of claim 9, wherein the zinc (II) amidine complex comprises amidine and carboxylate ligands.

14. The method of claim 9, wherein the zinc (II) amidine complex is present in the first aqueous resinous dispersion in an amount of 10 to 30 percent by weight, based on the total solids weight of the first aqueous resinous dispersion.

15. The method of claim 9, wherein the first aqueous resinous dispersion is substantially free of any at least partially blocked polyisocyanate.

16. The method of claim 9, wherein the first aqueous resinous dispersion is substantially free of tin-containing metal catalyst.

17. The method of claim 9, wherein the at least partially blocked polyisocyanate is selected so as to provide an aqueous resinous blend that cures at a temperature of 320° F. or below when combined with the first aqueous dispersion.

18. The method of claim 9, wherein the at least partially blocked polyisocyanate comprises a urethane-containing material having a moiety of the structure (3):

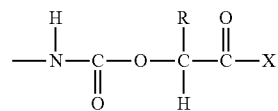

in which R is H, an alkyl, alkenyl, or aryl group, and X is H, an alkyl, alkenyl, an aryl group, or —N(R$_1$)(R$_2$), in which R$_1$ and R$_2$ are, each independently, H, an alkyl, an alkenyl, or an aryl group.

19. A method of coating a substrate, comprising placing the blend produced by the method of claim 9 in contact with an electrically conductive anode and an electrically conductive cathode, with a surface to be coated being the cathode.

20. The blend of claim 1, wherein at least a portion of the isocyanato groups of the at least partially blocked polyisocyanate have been reacted with a compound so that the resultant capped isocyanate portion is stable to hydroxyl or amine groups at room temperature but reactive with hydroxyl or amine groups at a temperature of 200° F. or higher.

* * * * *